US006325476B1

(12) United States Patent
Lee

(10) Patent No.: US 6,325,476 B1
(45) Date of Patent: Dec. 4, 2001

(54) INK JET PRINTER HAVING A SCAN MODULE DETACHABLY MOUNTED THEREON

(75) Inventor: Yong-duk Lee, Kyonggi-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/210,621

(22) Filed: Dec. 14, 1998

(30) Foreign Application Priority Data

Dec. 12, 1997 (KR) .................................................. 97/68381

(51) Int. Cl.[7] .............................. H04N 1/034; H04N 1/21
(52) U.S. Cl. .................................. 347/3; 358/296; 347/22
(58) Field of Search .................................. 347/3, 33, 19, 347/14, 152, 87, 29, 50, 86, 2, 49, 37; 400/149, 175, 8, 62, 37; 358/502, 296, 472

(56) References Cited

U.S. PATENT DOCUMENTS 5,451,990 * 9/1995 Sorenson et al. ...................... 347/37

6,091,514 * 7/2000 Hasegawa et al. .................. 358/296

* cited by examiner

Primary Examiner—John Barlow
Assistant Examiner—Charles W. Stewart, Jr.
(74) Attorney, Agent, or Firm—Robert E. Bushnell, Esq.

(57) ABSTRACT

Disclosed is an ink jet printer for having a scan module detachably mounted thereon. According to the present invention, the ink jet printer includes a body including a paper carrying section and a capping section formed at an outside of the paper carrying section; a guide shaft mounted to be normal to a direction of carrying the paper along a width of the body; and a carriage which has at least one scan module and a plurality of ink cartridges mounted thereon, the carriage is reciprocally moved along the guide shaft in the paper carrying section, and which is carried to the capping section when a printing or scanning is finished, wherein the scan module is detachably mounted on the carriage and a distance between the scan module and the capping section is larger than a distance between the ink cartridges and the capping section.

9 Claims, 5 Drawing Sheets

INK JET PRINTER HAVING A SCAN MODULE DETACHABLY MOUNTED THEREON

CLAIM OF PRIORITY

This application makes reference to, incorporates the same herein, and claims all benefits accruing under 35 U.S.C. §119 arising from an application for THE INKJET PRINTER USING EXCHANGE OF INKHEAD FOR SCANNER OF CARRIAGE earlier filed in the Korean Industrial Property Office on Dec. 12, 1997 and there duly assigned Ser. No. 68381/1997.

FIELD OF THE INVENTION

The present invention relates to an ink jet printer, and more particularly to an ink jet printer capable of scanning a document, in which a scan module is mounted on a carriage instead of one of ink cartridges, for examples color ink cartridges and mono ink cartridges, mounted on the carriage. Further, the present invention relates to an ink jet printer capable of preventing the scan module from being polluted by a cap mounted in a capping section when the scan module is mounted therein.

DESCRIPTION OF THE PRIOR ART

Generally, an ink jet printer is an apparatus for printing data transferred from a computer on a recordable paper, which has one or more than one ink cartridges mounted on a carriage. Ink jet printers can be combined with a scanner to form a device that can either scan a document or print a document. What is needed is an ink jet printer that can have a scanning module replace one of the ink cartridges allowing an ink jet printer to operate as a scanner.

SUMMARY OF THE INVENTION

It is therefore an object of the present invention to provide an ink jet printer for having a plurality of ink cartridges and at least one scan module mounted detachably on a carriage.

It is another object of the present invention to provide an ink jet printer in which a carriage is positioned in a capping section when a printing or scanning is finished in a case that a scan module is mounted in the ink jet printer.

It is still another object of the present invention to provide an inkjet printer in which a scan module is prevented from being polluted by a cap mounted on a capping section in a case that the scan module is mounted in the ink jet printer.

To accomplish the above object of the present invention, there is provided an ink jet printer for having a scan module detachablly thereon, having:

a body including a paper carrying section and a capping section formed at an outside of the paper carrying section;

a guide shaft mounted to be normal to a direction of carrying the paper along a width of the body;

a carriage having a plurality of ink cartridges mounted thereon, which is reciprocally moved along the guide shaft in the paper carrying section, and which is carried to the capping section when a printing or scanning operation is finished; and a scan module that is detachably mounted on the carriage and a distance between the scan module and the capping section is larger than a distance between the ink cartridges and the capping section.

The scan module is spaced from the capping section not to be contacted with a cap mounted in the capping section to prevent ink in nozzles of the ink cartridge from being dried.

The scan module can be mounted on the carriage instead of one of the plurality of the ink cartridges.

The cable for applying a predetermined signal to the scan module and the plurality of the ink cartridges includes private connectors which are respectively connected to each ink cartridge and common connectors which are connected to the scan module.

The scan module is basically the same size as one of the ink cartridges.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
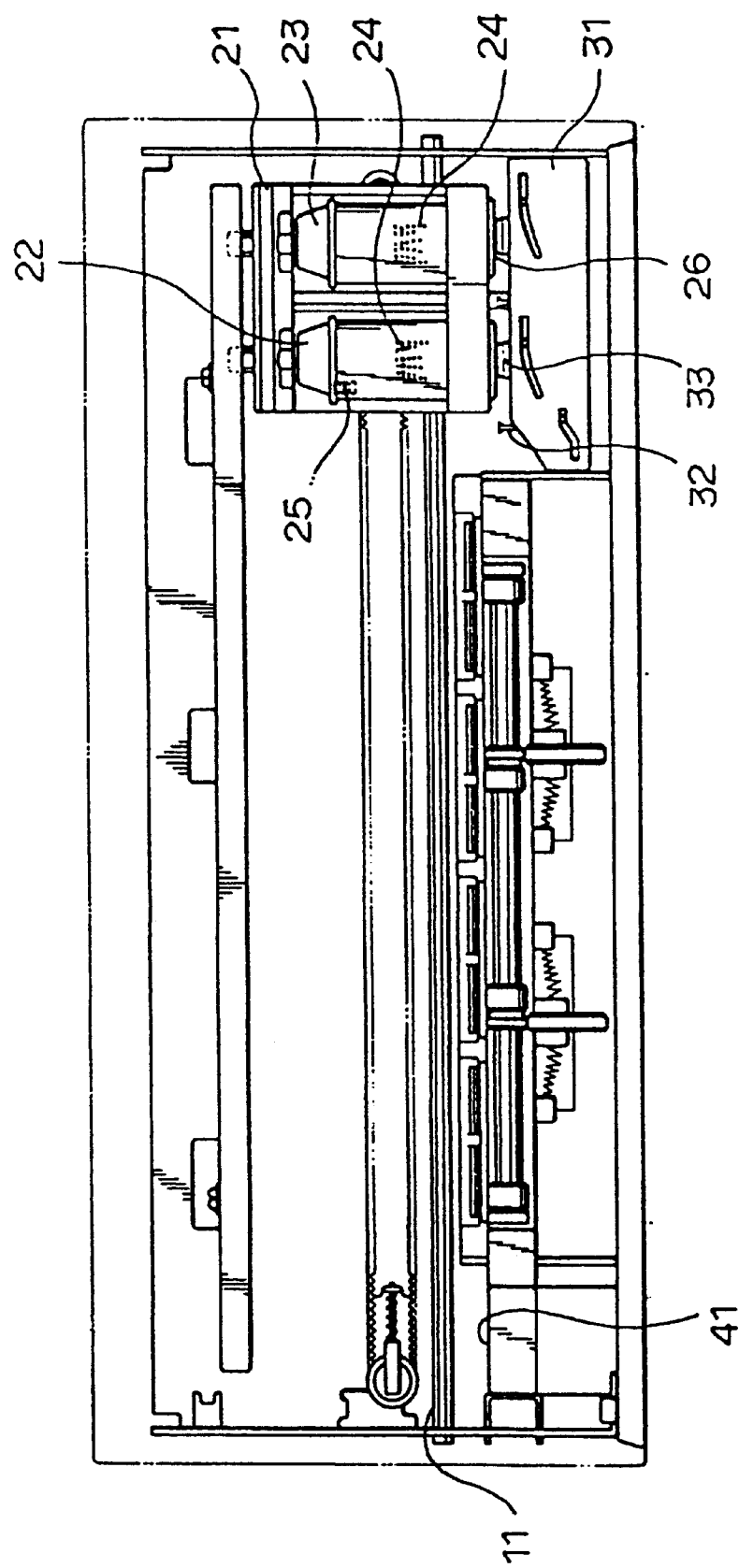
FIG. 1 is a front view of an ink jet printer according to the conventional art.

FIG. 1 is a front view of an ink jet printer according to the conventional art. As shown in FIG. 1, a color ink cartridge and a mono ink cartridge are mounted on a carriage. When a printing is performed, the carriage 21 is positioned at a side of the ink jet printer 10 according to an operation of a sensor 25 for detecting a position of the carriage. When the printer receives an instruction for printing from the computer, the sensor 25 detects the position of the carriage 21. If the carriage 21 is positioned at a specified position on the guide shaft 11, a controller (not shown) moves the carriage 21 to a side of the guide shaft 11.

A capping section 31 is formed at a lower portion of the ink jet printer 10 and a wiper 32 is mounted on an upper portion of the capping section 31 to wash a nozzle of the color and mono ink cartridges 22 and 23. A cap 33 is mounted in the capping section 31 to be opposite to the nozzle 26 of each ink cartridge 22 and 23 as the carriage 21 is positioned at the side of the guide shaft 11. Accordingly, the cap 33 prevents the ink in an entry of the nozzle 26 from being dried.

The carriage 21 moves reciprocally along the guide shaft 11 to perform the printing while the recordable paper is carried on a base frame 41. When the printing is completed, the carriage 21 moves along the guide shaft 11 to reach the capping section 31. At this time, the wiper 32 washes the ink off the nozzle 26 while contacting with the nozzle 26 of each ink cartridge 22 and 23. When the carriage 21 is stopped at the capping section 31, the cap 33 is positioned below the nozzle 26 to close the nozzle 26 tightly so that the ink in the entry of the nozzle can be prevented from being dried.

Head connectors 24 and 24' are respectively formed on a back surface of the color and mono ink cartridges 22 and 23.

On the other hand, a cable connector is formed at one end of a FPC cable connected to the controller to be corresponding to head connectors 24 and 24'. Accordingly, the head connectors 24 and 24' are in electric contact with the cable connector on the back surface of the carriage 21.

When the color ink cartridge 22 and the mono ink cartridge 23 are respectively incorporated with the carriage 21, the head connector 24 and 24' of the ink cartridges 22 and 23 is in close contact with the cable connector.

The connector 24 of the color ink cartridge 22 and the connector 24' of the mono ink cartridge 23 are separately mounted on the carriage 21 because signals transferred between the controller and the connectors 24 and 24' are different from each other.

Such ink jet printer is used for only printing and a separate scanner is needed for scanning a document.

Figure 2:
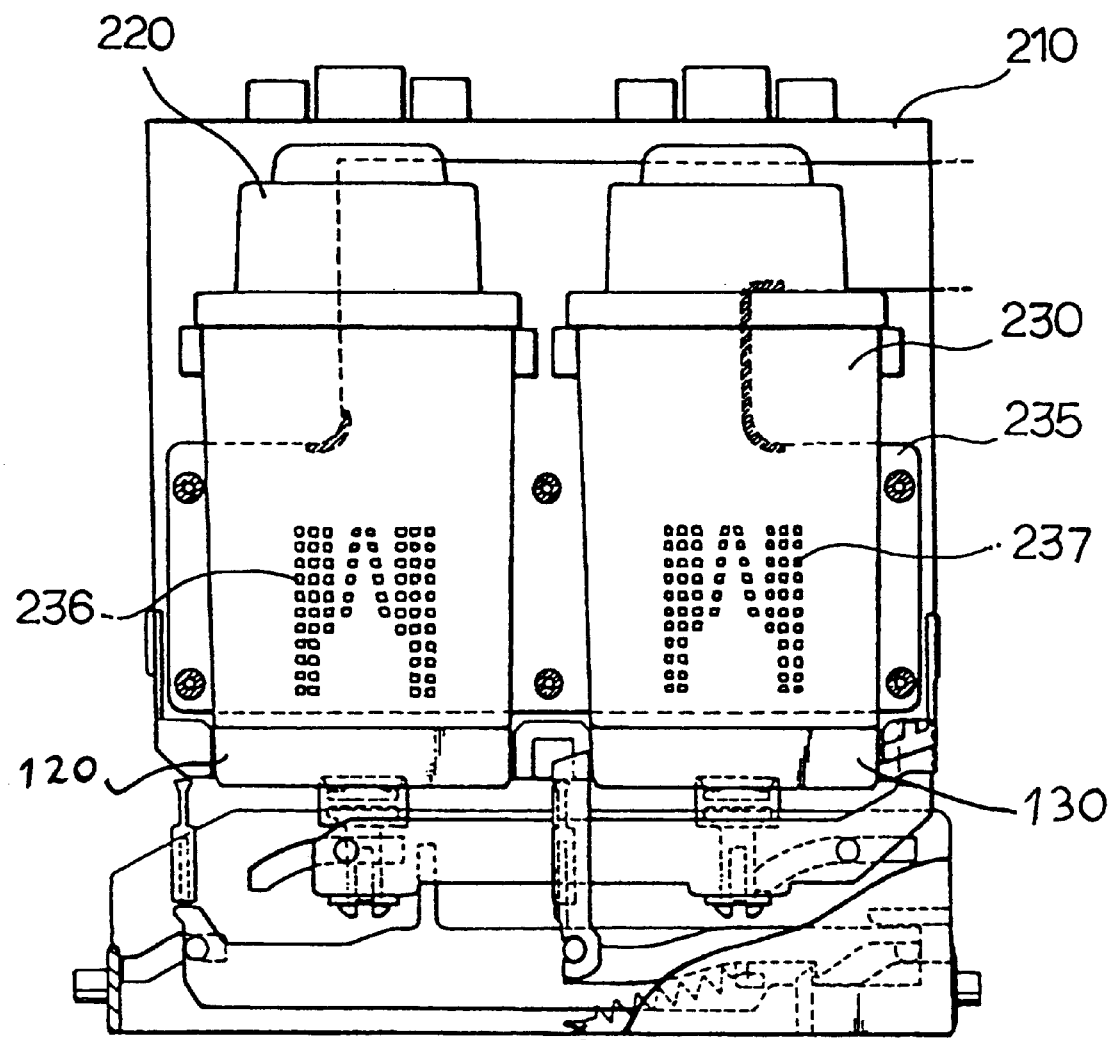
FIG. 2 is a front view of a carriage on which ink cartridges for mono or color ink are mounted according to the present invention.

FIG. 2 is a front view of a carriage on which ink cartridges for mono or color ink are mounted according to the present invention. The ink jet printer having two ink cartridges mounted therein will be described as example to help readers understanding.

A FPC (flexible printer cable) 235 is secured by a screw to a back plate of the carriage 210 which has a common FPC connector 236 and a private FPC connector 237 respectively corresponding to connectors of the FPC cable 235 for a color ink cartridge 220 and a mono ink cartridge 230. In this case, the common FPC connector 236 is formed at a position corresponding to the color ink cartridge 220, however, the common FPC connector 236 may be formed at a position corresponding to the mono ink cartridge 230. It is importance that the common FPC connector 236 must be formed at a position corresponding to a connector 238 on any one of the ink cartridges.

Since a connector of the ink cartridge and a connector of a scan module are selectively connected with the common FPC connector 236 as described below, an arrangement of holes for the common FPC connector 236 may be different from an arrangement of holes for the private FPC connector 237.

Figure 3:
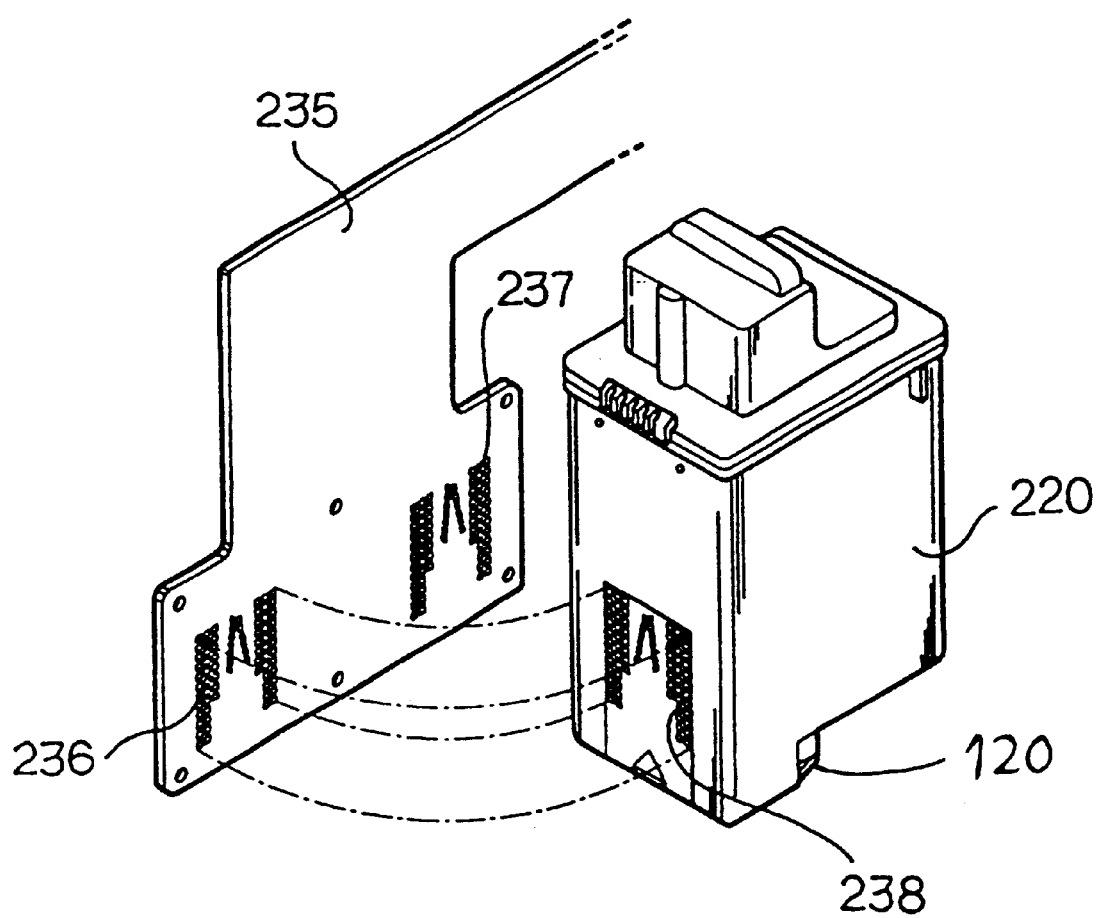
FIG. 3 is a perspective view of an ink cartridge detached from a FPC cable according to the present invention.

FIG. 3 is a perspective view of the color ink cartridge 220 which is detached from the common FPC connector 236 of the FPC cable 235 according to the present invention.

Figure 4:
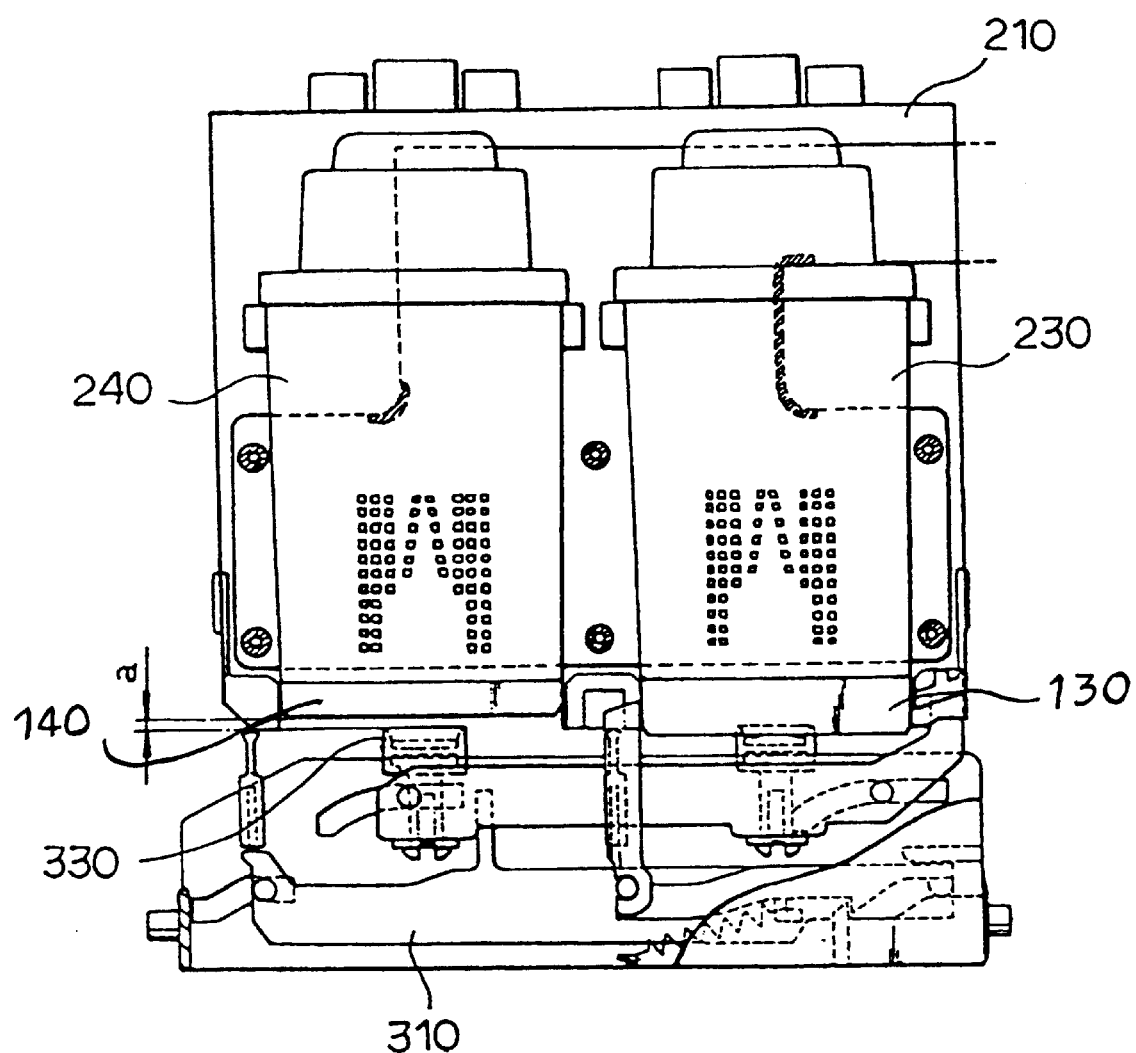
FIG. 4 is a front view of a carriage on which ink cartridges for mono or color ink are mounted according to the present invention.

FIG. 4 is a front view of the carriage on which the scan module and the mono ink cartridge are mounted according to the present invention.

Figure 5:
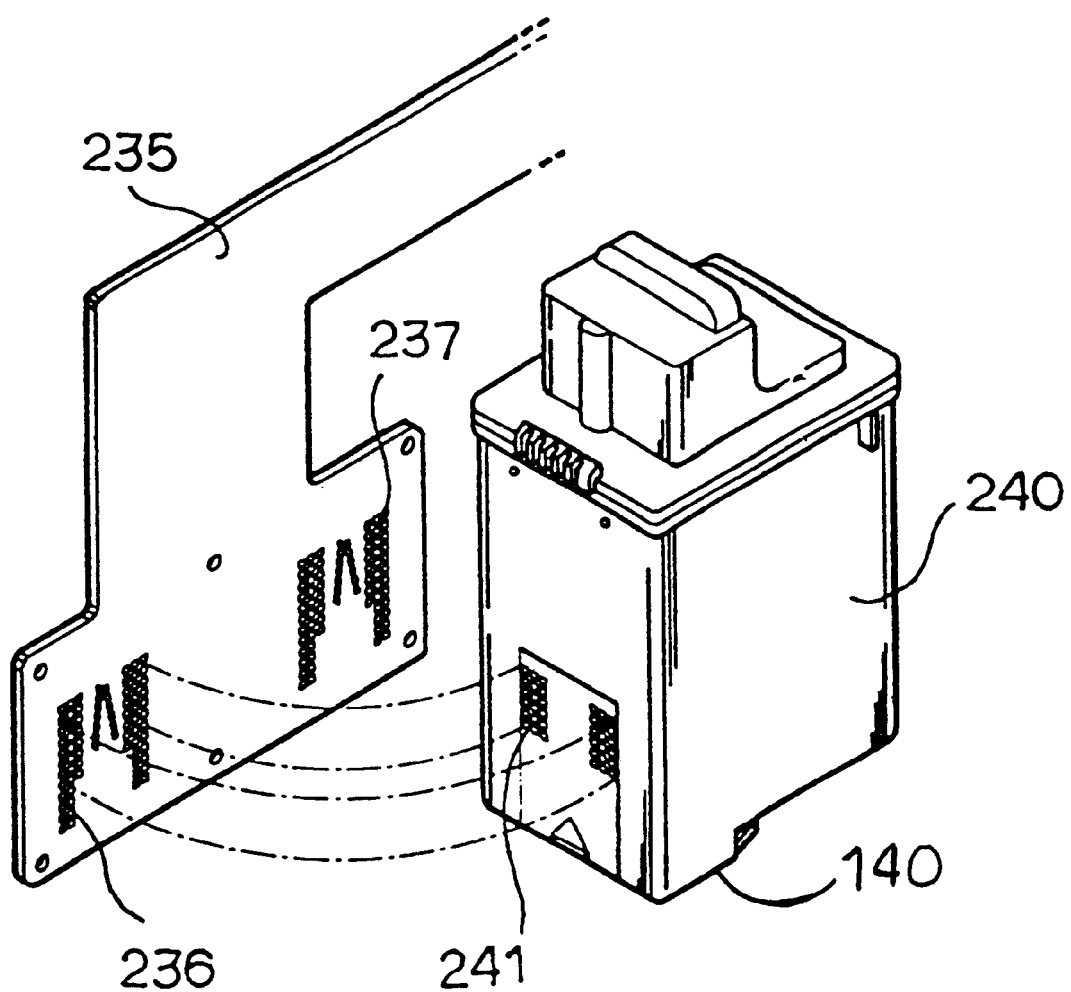
FIG. 5 is a perspective view of a scanner detached from a FPC cable according to the present invention.

The scan module 240 is basically the same size as the ink cartridge enough to be easy mounted on the carriage 210. As shown in FIG. 5, a connector 241 formed on a back surface of the scan module 240 especially is formed to be exactly corresponding to the common FPC connector 236 of the FPC cable 235.

According to the present invention, the scan module 240 has a lower portion 140 higher than a lower portion of ink cartridge 230, i.e., the ink head 130. Accordingly, the scan module 240 is spaced at a predetermined distance "a" from a cap 330 not to be in contact with the cap 330 when the carriage 210 moves to the capping section 310 formed at a corner of the ink jet printer.

Hereinafter, an operation of the ink jet printer according to the present invention will be described in detail. The ink jet printer will described with respect to the carriage 210 having the color ink cartridge 220 and the mono ink cartridge 230 mounted thereon.

When a printing is formed, the carriage 210 is moved along the guide shaft to one end of the guide shaft according to an operation of a sensor for detecting a position of the carriage.

The capping section 310 is formed at a side of a lower portion of the inkjet printer, on which a cap 330 is mounted to be opposite to nozzles of the respective ink heads 120 and 130 so as to prevent the ink at an entry of the nozzles from being dried.

The ink cartridge performs the printing normally according to a printing command of the controller and is introduced into and stops at the capping section 310 when the printing is completed.

On the other hand, in order to scan a document, a scan module 240 is mounted on the carriage 210 after one of the plural ink cartridges, for example the color ink cartridge 220, is detached from the carriage 210. Since the scan module 240 has the same size as the ink cartridge, the scan module 240 can be facilitated to be mounted on the carriage 210. Further, since connectors corresponding to the connectors 241 of the scan module 240 are provided to the common FPC connector 236 of the FPC cable 235 which is in electrical contact with the connector 241 of the scan module 240, the controller can recognize the scan module 240 as soon as being mounted on the carriage 210.

When the scan module 240 is mounted on the carriage 210, the connector 241 of the scan module 240 is in electrical contact with the common FPC connector 236 so that scanning signals are transferred from the controller to the connector 241 of the scan module 240 through the common FPC connector 236, thereby scanning the document.

When an electric motor for the carriage 210 is driven, the carriage 210 moves reciprocally along the guide shaft while the scan module 240 scans the document disposed on a base frame.

According to the present invention, after the scanning is completed by the scan module 240, the carriage 210 having the scan module 240 and the ink cartridge 230 is moved to the capping section 310. This results in preventing the ink in the nozzles of the ink cartridge from being dried. The ink head 130 of ink cartridge 230 comes in contact with the cap 330 at the capping section 310 to prevent the ink in the nozzles from being dried. Further, since the scan module 240 is spaced at the predetermined distance a from the cap 330, the scan module 240 is prevented from being polluted by the cap 330.

In another embodiment of the present invention, at least one scan module 240 is securely mounted on the carriage 210 along with the plurality of the ink cartridges. That is, the scan module 240 can be permanently secured to the carriage 210 because, unlike the ink cartridges, it is not necessary to periodically change the scan module. In the above case, the cap 330 may not be mounted in the capping section 310 to be corresponding to the scan module 240.

According to the present invention as described above, there are advantages in that the ink in the nozzles of the ink cartridge can be prevented by the cap from being dried and the scan module can be prevented from being polluted by the cap as the cap is not mounted in the capping section.

According to the present invention, there is another advantage in that the printing and scanning can be selectively performed as at least one scan module can be detachably mounted on the carriage along with the plurality of the ink cartridges.

Furthermore, as the scan module is made to be smaller size than the ink cartridge, the scan module can be prevented from being polluted in the capping section.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. An ink jet printer, comprising:
    a body including a paper carrying section and a capping section formed at an outside of the paper carrying section;
    a guide shaft mounted to be normal to a direction of carrying the paper along a width of the body;
    a carriage having a plurality of ink cartridges mounted thereon, said carriage is reciprocally moved along the guide shaft in the paper carrying section, and which is carried to the capping section when a printing or scanning operation is finished; and
    a scan module is detachably mounted on the carriage and a distance between the scan module and the capping section is larger than a distance between the ink cartridges and the capping section.

2. An inkjet printer as claimed in claim 1, wherein the scan module is spaced from the capping section not to be contacted with a cap mounted in the capping section to prevent ink in nozzles of the ink cartridge from being dried.

3. An inkjet printer as claimed in claim 1, wherein the scan module can be mounted on the carriage instead of one of the plurality of the ink cartridges.

4. An ink jet printer as claimed in claim 3, wherein a cable for applying a predetermined signal to the scan module and the plurality of the ink cartridges includes private connectors which is respectively connected to each ink cartridge and common connectors which is connected to the scan module.

5. An ink jet printer as claimed in claim 3, wherein the scan module has the same size as one of the ink cartridges.

6. An ink jet printer, comprising:
    a carriage;
    a plurality of ink cartridges mounted on said carriage; and
    a scan module detachably mounted on said carriage, wherein said scanner can be interchanged with one of said plurality of ink cartridges, and a distance between the scan module and a capping section is larger than distance the ink cartridge and the capping section.

7. The ink jet printer 6, wherein a connector is formed on a back side of said scan module that is identical to a connector formed on said plurality of ink cartridges.

8. A method for mounting a scan module on an ink jet printer, comprising the steps of:
    detaching an ink cartridge from a carriage on said ink jet printer;
    attaching a scanning module in place of said ink cartridge;
    operating said ink jet printer in either scan mode or print mode
    disconnecting electrical connectors between said carriage and said ink cartridge;
    electrically connecting connectors between said carriage and said scanning module; and
    removing a capping section underneath said scanning module before operation.

9. The method of claim 8, further comprising:
    attaching permanently said scanning module in the place of said ink cartridge.

* * * * *